(12) United States Patent
Schwager

(10) Patent No.: US 6,370,959 B1
(45) Date of Patent: Apr. 16, 2002

(54) FUEL PRESSURE SENSOR

(75) Inventor: Bryce Andrew Schwager, Ypsilanti, MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/467,524

(22) Filed: Dec. 21, 1999

(51) Int. Cl.$^7$ ................................. G01L 7/08

(52) U.S. Cl. ........................... 73/715; 73/725

(58) Field of Search ................. 73/715, 716, 717, 73/718, 719–727, 756, 714, 118.2, 117.3, 119 A; 123/445, 495, 494, 463, 497, 499; 29/530

(56) References Cited

U.S. PATENT DOCUMENTS

| | | | |
|---|---|---|---|
| 4,095,566 A | 6/1978 | Fox |
| 5,133,323 A | 7/1992 | Treusch |
| 5,509,390 A | 4/1996 | Tuckey |
| 5,762,046 A | 6/1998 | Holmes et al. |

Primary Examiner—Benjamin R. Fuller
Assistant Examiner—Abdullahi Aw-Musse
(74) Attorney, Agent, or Firm—Visteon Global Tech., Inc.

(57) ABSTRACT

A fuel pressure sensor 12 which receives air 62 from an intake manifold 58 and fuel 15 from a fuel rail 14 and which uses the received air 62 and fuel 15 to measure the fuel pressure within the fuel rail 14. The fuel pressure sensor 12 further including a semi-permeable membrane or member 60 which allows the air 62 to pass into the fuel pressure sensor 12 while concomitantly preventing the fuel 15 from passing into the intake manifold 58.

3 Claims, 2 Drawing Sheets

FUEL PRESSURE SENSOR

FIELD OF THE INVENTION

This invention relates to a fuel pressure sensor and more particularly to a fuel pressure sensor which measures the pressure of fuel residing within a fuel rail while concomitantly and substantially preventing the fuel from being communicated into the intake manifold.

BACKGROUND OF THE INVENTION

Fuel rails are used within vehicles to selectively receive and allow fuel to be communicated to the various fuel injectors of the engine. The received fuel creates a certain pressure within the fuel rail and this pressure is typically measured by a fuel sensor which communicates the measured pressure to a controller. The controller utilizes the measured pressure to vary the duty cycle of a fuel pump, effective to maintain optimal fuel pressure within the fuel rail and to the various fuel injectors.

Typically, a fuel pressure sensor includes a cavity into which a sensing member is disposed. The fuel pressure sensor further includes a pair of orifices which respectively allow communication between the sensing member and the fuel rail and between the sensing member and the intake manifold. In this manner, the amount of pressure which is sensed by and/or which is applied to the sensing member, resident within the cavity, is indicative of the fuel pressure within the fuel rail.

While these prior sensors adequately measure the amount of pressure within the fuel rail, they suffer from at least one drawback. That is, should the sensing member fail or become damaged, fuel may be communicated from the fuel rail and into the intake manifold, thereby causing hydro-locking of the engine, stalling of the vehicle, and/or the generation of various undesirable types of vehicle emissions.

There is therefore a need for a new and improved fuel pressure sensor which substantially prevents the contained fuel from undesirably entering the intake manifold and which substantially prevents such undesired hydro-locking, stalling, and/or the generation of these various undesirable types of vehicle emissions.

SUMMARY OF THE INVENTION

According to a first object of the present invention a fuel pressure sensor is provided which overcomes at least one of the drawbacks of prior fuel pressure sensors.

According to a second object of the present invention, a fuel pressure sensor is provided which overcomes at least one drawback of prior sensors and which measures the pressure of fuel which resides within a fuel rail while concomitantly and substantially preventing the fuel from being communicated into the intake manifold.

According to a third object of the present invention, a fuel pressure sensor is provided which is adapted to be selectively coupled to an intake manifold and to the fuel rail, which is adapted to sense and/or measure the pressure which exists within the fuel rail by the use of air which is communicated into the sensor through the intake manifold, which is adapted to generate an electrical signal indicative of the sensed and/or measured fuel pressure, and which is further adapted to substantially prevent fuel from entering the air intake manifold.

According to a first aspect of the invention, a fuel pressure sensor is provided for use in combination with an intake manifold and a fuel rail which contains fuel. The contained fuel creates a certain pressure within the fuel rail. The fuel pressure sensor comprises a hollow body forming a cavity and having a first end portion which includes a first aperture which allows the intake manifold to communicate with the cavity. The fuel pressure sensor includes a sensor member which is operatively deployed within the cavity and a second end portion which includes a second aperture which allows the fuel contained within the fuel rail to be communicated to the sensor member. The fuel pressure sensor further includes a material which is disposed within the cavity and which substantially prevents the movement of the fuel from the fuel rail into the first aperture.

These and other features, aspects, and advantages of the invention will become apparent from the following detailed description and by reference to the following drawings.

DETAILED DESCRIPTION OF THE PREFERRED EMBODIMENT OF THE INVENTION

Figure 1:
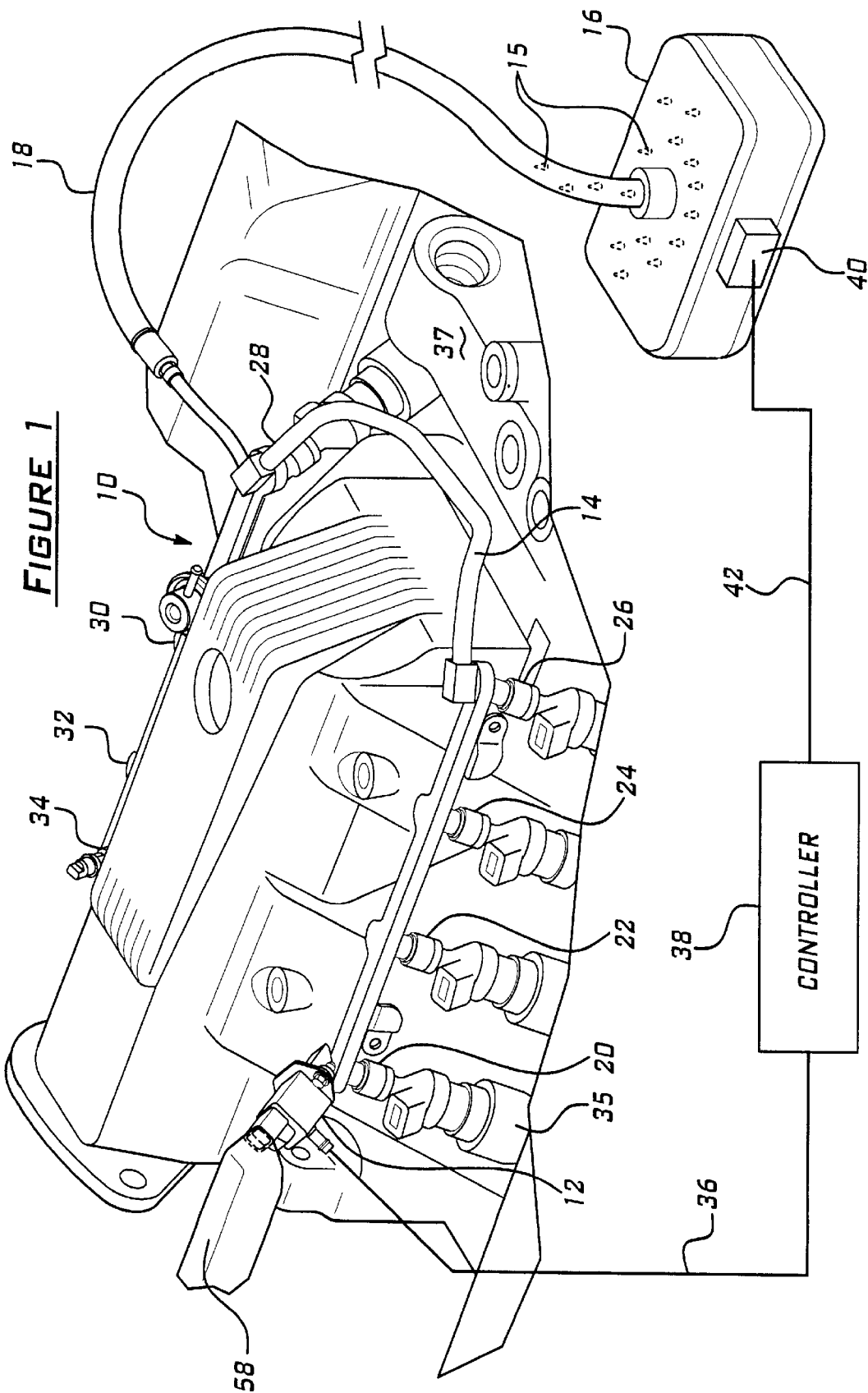
FIG. 1 is a perspective view of a fuel rail incorporating a fuel pressure sensor which is made in accordance with the teachings of the preferred embodiment of the invention and which is shown in an operatively assembled relationship with a typical vehicle engine and a fuel tank.

Referring now to FIG. 1 there is shown a conventional vehicle fuel rail assembly 10 of the "electronic returnless" type, and which incorporates or includes a fuel pressure sensor 12 which is made in accordance with the teachings of the preferred embodiment of the invention and which is operatively deployed within the fuel rail 10 in a known manner. It should be appreciated, by those of ordinary skill in the art, that fuel rail assembly 10 includes a generally hollow body 14 which receives fuel 15 from fuel tank 16 by use of member 18 and which is operatively disposed upon an air-intake manifold 58 in a conventional and known manner. Particularly, the fuel 15 is pumped from the fuel tank 16 and into member 18 by a typical and/or conventional fuel pump 40 which typically resides within the fuel tank 16. The contained fuel 15 creates a pressure within the body 14. Further, body 14 includes several apertures, such as apertures 20, 22, 24, 26, 28, 30, 32, and 34 which are communicatively coupled to a unique one of the cylinders 35 of the vehicle engine 37 and which, more particularly, communicate fuel to these respective cylinders 35.

Fuel pressure sensor 12 measures the fuel pressure within the fuel rail member 14, generates an electrical signal which is indicative of the measured pressure, and transmits the generated electrical signal onto bus 36, thereby communicating the measured pressure value to a controller 38 which typically operates under stored program control. The controller 38 is communicatively and physically coupled to the fuel pump 40 by use of bus 42 and appropriately modifies the "duty cycle" of the fuel pump 40 in accordance with the pressure measurement. That is, if the pressure measurement indicates that the fuel pressure within the fuel rail 14 (i.e., within the fuel rail body 14) is relatively high, controller 38 deactivates the fuel pump 40 for a certain period of time. Conversely, if the pressure measurement indicates that the fuel pressure within the fuel rail 14 (i.e., within the fuel rail body 14) is relatively low, controller 38 activates the fuel pump 40 for a certain period of time. In this manner, controller 38 cooperates with the fuel pressure sensor 12 to ensure that an optimal amount of fuel 15 is present within the fuel rail 14.

Figure 2:
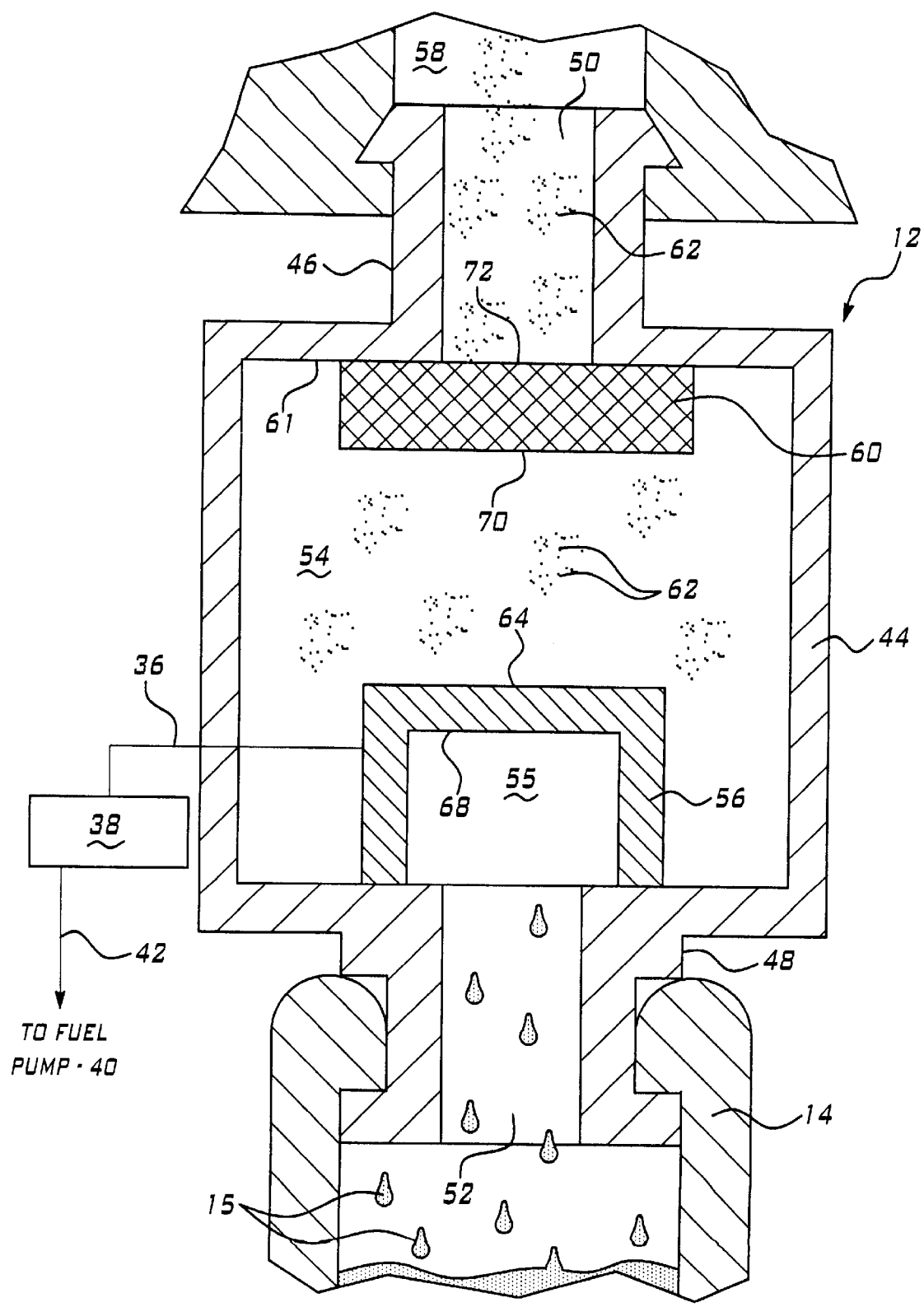
FIG. 2 is a side sectional view of the fuel pressure sensor which is shown in FIG. 1.

As shown best in FIG. 2, the fuel pressure sensor 12 includes a generally hollow body 44 having opposed and integrally formed protrusions 46, 48. Each protrusion 46, 48 includes and/or forms a respective aperture or orifice 50, 52 which allow communication into the cavity 54 which is formed within the hollow body 44. Moreover, a substantially "cup-shaped" sensing element or member 56 is disposed within the cavity 54, over the aperture or orifice 52 and under the aperture or orifice 50. Particularly, as best shown in FIG. 2, the interior portion 55 of member 56 communicates with orifice or aperture 52.

During assembly, protrusion portion 48 is placed within the fuel rail member 14 while the protrusion portion 46 is placed within the intake manifold 58 of the engine 37. Further, in the preferred embodiment of the invention, sensor 12 includes a semi-permeable membrane or member 60 which overlays aperture or orifice 50 and which may be attached to the interior surface 61 of cavity 54 by a conventional and/or commercially available adhesive or by conventional fastening devices or mechanisms.

In operation, air 62 enters the protrusion member 46 through orifice or aperture 50. The received air 62 traverses the semi-permeable membrane or member 60, enters cavity 54, and impinges upon the top surface 64 of the sensing member 56. Fuel 15, which is contained within the body of the fuel rail 14, enters protrusion portion 48 through aperture or orifice 52. The received fuel 15 impinges upon the bottom surface 68 of the sensing member 56. In one embodiment of the invention, sensing element or member 56 comprises a piezo-electric member which produces an output signal upon the bus 36 which is representative of the mathematical difference of the pressure that the fuel 15 exerts upon the surface 68 and the pressure that is exerted upon surface 64 by the air 62. In this manner, the generated pressure measurement signal is substantially representative of the pressure of the fuel 15 contained within the fuel rail member 14. Controller 38 may periodically "read" the pressure measurement signals in order to acquire substantially "real time" and/or desirably updated fuel pressure information.

The semi-permeable membrane or member 60 substantially prevents the fuel 15 from being communicated into the intake manifold 58 in the event that the sensing member or element 54 is broken or damaged. That is, the semi-permeable membrane or member 60 which in one embodiment of the invention comprises expanded polytetrafluoroethylene, a material commonly known as GORE-TEX®, and/or a material commonly known as Teflon®, substantially prevents chained type molecules, such as liquid fuel 15, from passing from one side or surface 70 of the member 60 to the other side or surface 72, thereby protecting the intake manifold 58 and the engine 37 from fuel entry or ingress, while concomitantly allowing unchained molecules, such as air 62, to pass through the intake manifold 58 and into the cavity 54 (i.e., from surface or side 72 to the surface or side 70), where the air 62 is used to gain an accurate fuel pressure measurement.

In other non-limiting embodiments of the invention, the material 60 may comprise a circular shape which frictionally and selectively fits within the orifice or aperture 50 and/or may comprise multiple layers of substantially identical material. In further non-limiting embodiments, the material 60 is "press fit" onto surface 61 or within orifice or aperture 50. Further, depending upon the thickness of member or material 60 and the pressure of the fuel 15 within the fuel rail 14, the incoming fuel 15 may only be slowed before it enters the air-intake manifold 58 through material 60 and orifice/aperture 50. This speed or velocity reduction remains desirable however, since the relatively slower traveling fuel 15 allows the engine 37 to utilize the fuel 15 as it is communicated into the manifold 58, thereby substantially preventing engine hydro-locking and/or stalling.

It is to be understood that the invention is not limited to the exact scope or construction which has been illustrated and described above, but that various changes may be made without departing from the spirit and the scope of the inventions, as set forth in the following claims.

What is claimed is:

1. A fuel pressure sensor for use in combination with an air intake manifold and a fuel rail, said fuel pressure sensor comprising a generally hollow body having a pair of aligned protrusions, a first of said pair of aligned protrusions being operatively disposed within said air intake manifold and having an aperture which allows communication between said air intake manifold and said generally hollow body, a second of said pair of aligned protrusions being operatively disposed within said fuel rail and having an aperture which allows communication between said fuel rail and said generally hollow body; a cupped shaped sensing element which is disposed within said generally hollow body and positional over said aperture of said second of said pair of aligned protrusions and underneath of said aperture of said first of said pair of aligned protrusions; a semi permeable membrane which allows only the passage of unchained molecules, which covers said aperture of first of said pair of aligned protrusions, which resides above said cupped shaped sensing element, and which is effective to allow air to be communicated from said intake manifold to a top surface of said cupped shaped sensing element, wherein said aperture of said second of said pair of aligned protrusions is effective to allow fuel to impinge upon a bottom surface of said cupped shaped sensing element effective to allow said cupped shaped sensing element to determine the pressure of fuel resident within said fuel rail.

2. A fuel pressure sensor for use in combination with an air intake manifold and a fuel rail, said fuel pressure sensor comprising a generally hollow body having a pair of aligned protrusions, a first of said pair of aligned protrusions being operatively disposed within said air intake manifold and having an aperture which allows communication between said air intake manifold said generally hollow body, a second of said pair of aligned protrusions being operatively disposed within said fuel rail and having an aperture which allows communication between said fuel rail and said generally hollow body; a cupped shaped sensing element which is disposed within said generally hollow body and which is positioned over said aperture of said second of said pair of aligned protrusions and underneath said aperture of said first of said pair of aligned protrusions; a semi permeable membrane which covers said aperture of first of said pair of aligned protrusions and which resides above said cupped shaped sensing element, said semi permeable membrane being effective to allow air to be communicated from said intake manifold to a top surface of said cupped shaped sensing element while said aperture of said second of said pair of aligned protrusions being effective to allow fuel to impinge upon a bottom surface of said cupped shaped sensing element effective to allow said cupped shaped sensing element to determine the pressure of fuel resident within said fuel rail, wherein said membrane allows fuel to enter said intake manifold at a relatively slow speed.

3. A fuel pressure sensor for use in combination with an air intake manifold and a fuel rail, said fuel pressure sensor comprising a generally hollow body having a pair of aligned protrusions, a first of said pair of aligned protrusions being operatively disposed within said air intake manifold and having an aperture which allows communication between said air intake manifold and said generally hollow body, a second of said pair of aligned protrusions being operatively disposed within said fuel rail and having an aperture which allows communication between said fuel rail and said generally hollow body; a cupped shaped sensing element which is disposed within said generally hollow body and positional over said aperture of said second of said pair of aligned protrusions and underneath of said aperture of said first of said pair of aligned protrusions; a semi permeable membrane having a plurality of membrane layers and which only allows the passage of unchained molecules of fuel which is press fitted within said aperture of said first of said pair of aligned protrusions, which prevents fuel from entering said an intake manifolds and which resides above said cupped shaped sensing element, said semi permeable membrane being effective to allow air to be communicated from said intake manifold, to a top surface of said cupped shaped sensing element while said aperture of said second of said pair of aligned protrusions being effective to allow fuel to impinge upon a bottom surface of said cupped shaped sensing element to allow said cupped shaped sensing element to determine the pressure of fuel resident within said fuel rail.

* * * * *

UNITED STATES PATENT AND TRADEMARK OFFICE
CERTIFICATE OF CORRECTION

PATENT NO. : 6,370,959 B1
DATED : April 16, 2002
INVENTOR(S) : Bryce Andrew Schwager It is certified that error appears in the above-identified patent and that said Letters Patent is hereby corrected as shown below:

<u>Title page,</u>
Item [73], should read as follows:

-- Ford Global Technologies, Inc., Dearborn, MI --

Signed and Sealed this

Fifteenth Day of October, 2002

Attest:

Attesting Officer

JAMES E. ROGAN
*Director of the United States Patent and Trademark Office*